Oct. 24, 1967  G. H. THOMAS ETAL  3,349,257
SINE WAVE SYNTHESIS CIRCUIT
Filed Oct. 22, 1965  2 Sheets-Sheet 1

INVENTORS
Glen H. Thomas and
Robert S. Morrow.
BY
ATTORNEY

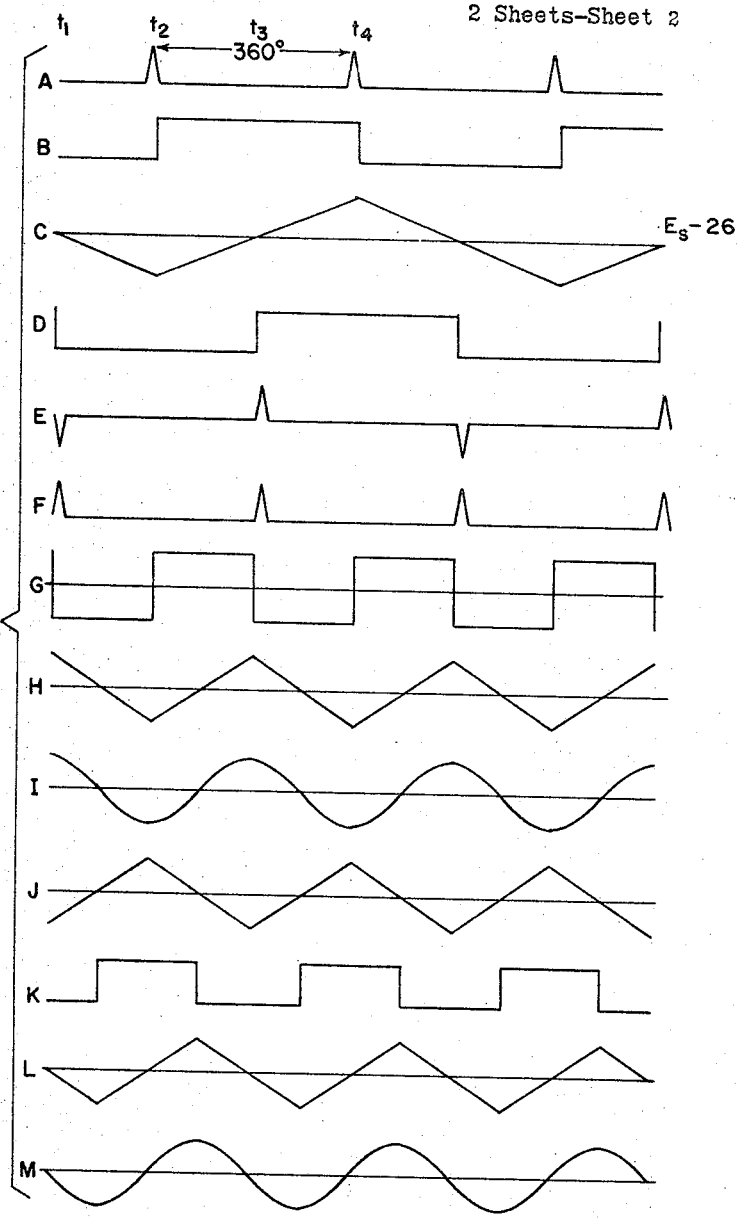
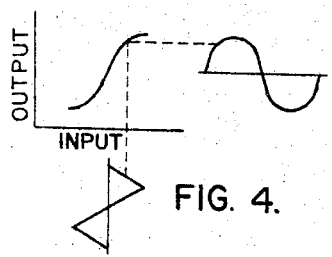
FIG. 2.
FIG. 4.
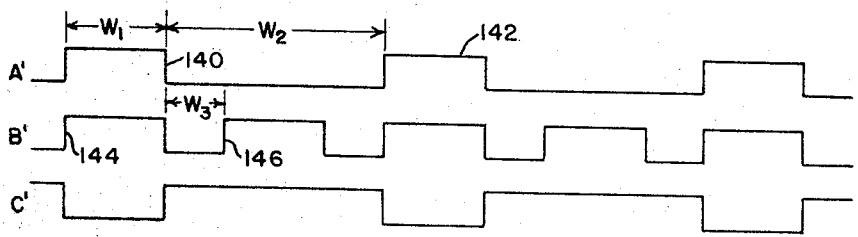
FIG. 3.

United States Patent Office 3,349,257
Patented Oct. 24, 1967

3,349,257
SINE WAVE SYNTHESIS CIRCUIT
Glen H. Thomas and Robert S. Morrow, Columbus, Ohio, assignors to International Research and Development Corporation, Worthington, Ohio, a corporation of Ohio
Filed Oct. 22, 1965, Ser. No. 501,175
9 Claims. (Cl. 307—88.5)

ABSTRACT OF THE DISCLOSURE

Described is circuitry for converting a pulsed input signal into a sine wave output signal by means of apparatus responsive to the pulsed input signal for producing a symmetrical square-wave signal which passes through one 360° cycle for each pulsed input signal, means coupled to the output of said apparatus for varying the amplitude of the symmetrical square-wave signal in inverse proportion to the repetition rate of the input pulses, an integrator coupled to the output of the amplitude varying means for producing a triangular waveform of constant amplitude regardless of the repetition rate of the input pulses, and a sine wave shaper coupled to the output of the integrator.

The present application is a continuation-in-part of copending application Ser. No. 442,150, filed Mar. 23, 1965, and assigned to the assignee of the present application.

This invention relates to circuitry for converting a pulsed input signal into one or more sine wave output signals which can vary in frequency over a wide range, and more particularly to a circuit of the type described in which the output sine wave signals are of constant amplitude and have a specified phase relationship with respect to the input pulses.

While not limited thereto, the present invention is particularly adapted for use with vibration analyzing apparatus for balancing rotating bodies and the like. Such apparatus commonly utilizes an electromagnetic transducer or vibration pickup in contact with the bearings or housing of a rotating body for transforming mechanical vibrations into an electrical signal having a fundamental frequency equal to that of the vibrations and an amplitude proportional to the magnitude of the vibrations. The signal may then be used in appropriate circuitry for determining a point of unbalance on the rotating body such that the condition may be compensated by adding or removing balancing weights or the like.

In a balancing operation, it oftens happens that two or more sources of unbalance are present in a piece of equipment to be balanced and are generating vibrations of different frequencies, with the result that a composite electrical signal composed of several different frequencies is produced by an electromagnetic transducer in contact with the equipment. Therefore, in order to derive a signal having the frequency of the part to be balanced, it becomes necessary to employ a band-pass filter which will separate a particular frequency associated with a single vibrating part from all other frequencies in order to effect a balancing operation.

Furthermore, since the speed of rotation of the body being balanced may vary over a relatively wide range, and since the rotational speed cannot always be maintained constant during the balancing operation, it is preferable to use a filter of the synchronous band-pass type in which the bass-band varies automatically as a function of the speed of the rotating body being analyzed. The pass-band of such synchronous filters, in turn, is usually controlled by means of an alternating current signal which varies in frequency as the speed of the rotating body varies. This signal must have a specified phase relationship with respect to the unbalance signal and be of constant amplitude.

While such a signal can be derived by means of a tachometer generator which is mechanically connected to the rotating body, it is sometimes difficult and usually inconvenient to provide the necessary mechanical connection between the tachometer generator and the rotating body. On the other hand, it is relatively easy to obtain a pulsed signal having a pulse repetition rate corresponding to the speed of the rotating body by means of a photocell or magnetic pickup. In the case of a photocell, for example, it can be directed onto a rotating body having a light or dark spot thereon, as the case may be, such that the photocell will produce one pulse for each revolution of the body. The magnetic pickup can be used in combination with a slot in the rotating body in accordance with well-known techniques. Such pulses, however, must then be converted into a sine wave signal for the purpose of controlling the aforesaid synchronous band-pass filter. The present invention provides apparatus for accomplishing this result and comprises an improvement in the subject matter of the aforesaid copending application Ser. No. 442,150, of which the present application is a continuation-in-part.

The objects of the invention include:

To provide new and improved means for generating a sine wave signal having a frequency which varies over a wide range as the speed of rotation of a rotating body fluctuates without requiring any mechanical connection to the body;

To provide means, responsive to a pulsed input signal, for generating a sine wave signal of constant amplitude regardless of the frequency of the pulsed input signal;

To provide means, not requiring any mechanical connection to a rotating body, for producing two sine wave signals, each of which has the same frequency as the speed of rotation of the rotating body, but which are displaced in phase with respect to each other by 90°;

To provide apparatus employing a field effect transistor for synthesizing a sine wave output signal from a triangular waveform.

While the circuitry described in the aforesaid copending application Ser. No. 442,150 also accomplishes somewhat the same overall objects as the foregoing and is generally satisfactory for its intended purpose, it does have certain disadvantages. For example, it requires three integrators in cascade for the purpose of generating one of the two sine wave signals required by the synchronous filter. This requirement creates excessive noise buildup, particularly at lower frequencies. Furthermore, the circuitry described in the former application is somewhat complicated for its intended purpose, particularly as regards the means for maintaining the sine wave signal outputs of constant amplitude regardless of changes in the input frequency. Also, the sine wave shapers employed in the former application require a relatively large number of expensive circuit elements. These and other drawbacks of the system shown in application Ser. No. 442,150 are eliminated by the present invention as will become apparent hereinafter.

Other objects and features of the invention will become apparent from the following detailed description taken in connection with the accompanying drawings, in which:

FIGURE 2 illustrates waveforms appearing at various points in the circuit of FIGURE 1;

FIGURE 3 is a series of waveforms illustrating the operation of the amplitude compensating circuitry of the invention; and FIGURE 4 is a graph illustrating the input-output characteristics of the field effect transistor circuit of FIGURE 1 for converting a triangular waveform into a pure sine wave.

Figure 1:
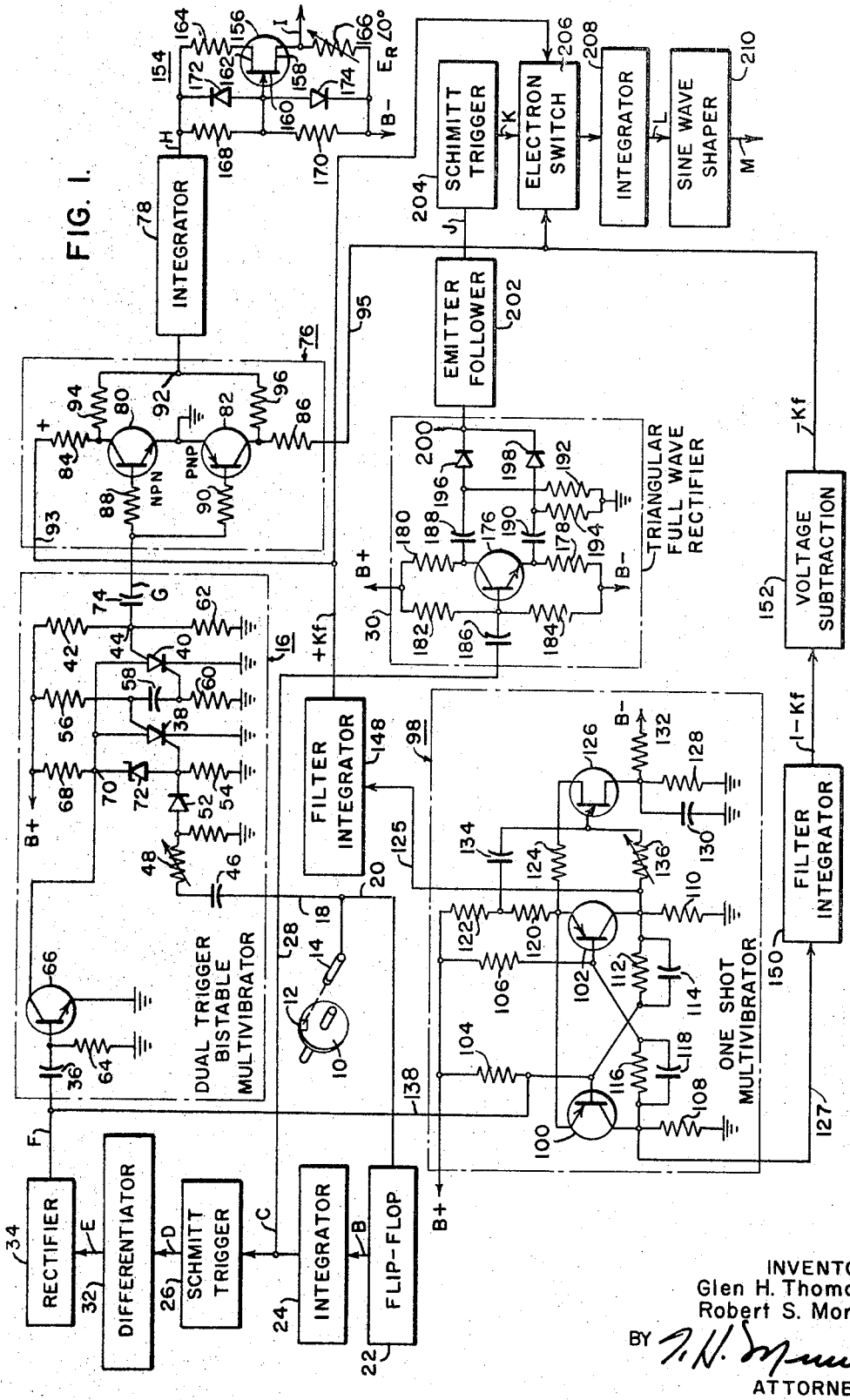
FIGURE 1 is a partial block and schematic circuit diagram of the sine wave synthesis apparatus of the invention.

With reference now to the drawings, and particularly to FIGURE 1, a rotating member 10 is shown which, in the example given, is light-colored and has a dark spot 12 at one point around its periphery such that a photocell 14 will be actuated to produce an output pulse once during each rotation of the member 10. Alternatively, the spot 12 could be replaced by a keyway, assuming that the member 10 is magnetically permeable, and the photocell 14 replaced by a magnetic pickup with the same overall effect.

The resulting pulses, illustrated as waveform A in FIGURE 2, are applied directly to a dual trigger bistable multivibrator 16 (enclosed by broken lines in FIGURE 1), through conductor 18. The pulses from photocell 14 are also applied through conductor 20 to a flip-flop circuit 22 of the type which will switch from one stable state to the other whenever an input pulse is applied thereto. Consequently, the output of the flip-flop circuit 22 will appear as square waveform B in FIGURE 2 where the leading and trailing edges of each pulse in the square wave coincide with an associated one of the pulses in waveform A from photocell 14. By integrating the waveform B in integrator 24, waveform C of FIGURE 2 is produced. This waveform is applied to a Schmitt trigger circuit 26, as well as through conductor 28 to a triangular full wave rectifier 30, hereinafter described in greater detail. Considering, first, the Schmitt trigger circuit 26, it is a type of multivibrator, well-known in the art, which will shift from one stable state to another whenever the magnitude of an input signal rises above a predetermined amplitude. The circuit will remain in its other stable state until the magnitude of the input signal falls below the aforesaid predetermined amplitude, at which point it will switch back to its original stable sttae. Therefore, by causing the circuit 26 to fire at the voltage level $E_s$–26 shown on waveform C in FIGURE 2, the waveform D will be produced at the output of the Schmitt trigger circuit 26. This latter waveform, it will be noted, is displaced 90° with respect to waveform B, but has the same shape as waveform B.

The resulting waveform D from circuit 26 is then applied to a differentiator 32 which produces waveform E of FIGURE 2 comprising a series of spiked pulses in which a positive pulse appears at the leading edge of each squarewave pulse in waveform D and a negative pulse appears at the trailing edge. By passing waveform E through a rectifier 34, the negative pulses in waveform E are inverted, producing waveform F in FIGURE 2 wherein the spiked pulses are intermediate those in waveform A. These pulses are applied to the dual trigger bistable multivibrator 16 through a coupling capacitor 36; and it will be appreciated that the effect of passing the pulses from photocell 14 through the circuitry, starting with flip-flop 22 and ending with rectifier 34, has been to shift the phase of those pulses by 180°. This, of course, is best illustrated by a comparison of waveforms A and F in FIGURE 2.

The dual trigger bistable multivibrator 16 includes two silicon controlled switches 38 and 40 connected such that when one switch 38 or 40 conducts, the other is cut off and vice versa. At time $t_1$ shown in FIGURE 2, the switch 40 will conduct, whereby the current from the B+ voltage source will flow through resistor 42 to drive the output terminal 44 of circuit 16 less positive. This condition will exist with the switch 40 conducting until time $t_2$ is reached as shown in FIGURE 2. At this time, a pulse in waveform A is applied through conductor 18, a capacitor 46 and a variable resistor 48 across resistor 50. The pulse is also applied through diode 52 across resistor 54; and the resulting voltage across resistor 54 applies a positive bias to the gate electrode of the silicon controlled switch 38, whereupon the switch 38 conducts.

As the switch 38 conducts, current is drawn through resistor 56, thereby lowering the anode potential on switch 38. This reduction in potential is instantaneously applied through capacitor 58 and bias resistor 60 to the gate of switch 40, thereby causing this switch to cut off. As switch 40 cuts off, its anode potential rises such that the output waveform G in FIGURE 2 rises in potential at time $t_2$. The foregoing switching action occurs with extreme rapidity and, hence, the potential in waveform G rises abruptly, creating a square-wave configuration.

The voltage at output terminal 44 will remain at its higher value with current flowing though resistors 42 and 62 until a pulse in waveform F is received at time $t_3$ in FIGURE 2. This pulse is applied through coupling capacitor 36 and across resistor 64, thereby causing NPN transistor 66 to conduct. When transistor 66 conducts, current is drawn through resistor 68, thereby lowering the potential at point 70. This potential, applied to the anodes of switches 38 and 40, causes switch 38 to cut off and switch 40 to conduct, whereupon the voltage of waveform G of FIGURE 2 falls abruptly. At time $t_4$, another pulse in waveform A is received via lead 18 from photocell 14, whereupon the process is repeated; and it will be appreciated that a symmetrical square-wave signal (waveform G) is derived in which the cycle of the square wave is repeated once during each rotation of the member 10 and once for each pulse from photocell 14. Zener diode 72 in the circuit of FIGURE 1 is utilized for the purpose of establishing a voltage level at which the switching action will occur.

The output of the dual trigger bistable multivibrator 16 appearing at point 44 and comprising waveform G in FIGURE 2 is applied through capacitor 74 and an electron switch 76, enclosed by broken lines, to an integrator 78. As is known, the output of an integrator is frequency sensitive. That is, if we consider that the fundamental of the square wave G at the output of circuit 16 is $E_1 \sin wt$, then the integral of this fundamental will be $-E_{1/w} \cos wt$. Therefore, in order to produce an integrated output which is insensitive to frequency variations, it is necessary to eliminate the frequency factor $w$. This is accomplished by means of circuitry including the electron switch 76 having NPN and PNP transistors 80 and 82 therein. The emitters of both transistors 80 and 82 are connected to ground, as shown. The collector of transistor 80 is connected to a source of varying positive potential through resistor 84; and, in a similar manner, the collector of transistor 82 is connected to a source of varying negative voltage through resistor 86. The square waveform G from circuit 16 is applied to the bases of both transistors 80 and 82 through resistors 88 and 90, respectively.

The transistors 80 and 82 act, essentially, as switches. On the positive half cycle of waveform G, transistor 80 will conduct; while on the negative half cycle the transistor 82 will conduct. The values of resistors 84 and 86 are the same and, for example, may have a resistance value of 22,000 ohms. Similarly, the values of resistors 94 and 96 are the same and may, for example, be 150,000 ohms. It will be immediately apparent that the combination of resistors 84, 94, 96 and 86 comprises a voltage divider. Furthermore, assuming that the positive voltage applied to the upper end of resistor 84 is equal to the negative voltage applied to the lower end of resistor 86, and assuming further that neither transistor 80 nor 82 is conducting, the voltage at point 92 will be zero.

When transistor 80 conducts on the positive half cycle of waveform G, the junction between resistors 84 and 94 will, in effect, be grounded and the magnitude of the positive square-wave signal at point 92 will be dependent upon the magnitude of the voltage applied to resistor 86. Similarly, when transistor 82 conducts, the junction between resistors 86 and 96 will become grounded and the magnitude of the negative pulse at point 92 will be dependent upon the magnitude of the voltage applied to resistor 84.

If the magnitude of the voltages applied to resistors 84 and 86 are equal, and if the magnitudes of these voltages can be made to vary simultaneously in direct proportion to the frequency of the square-wave signal G from circuit 16, then the frequency factor, $w$, will be eliminated from the foregoing expression:

$$-E_{1/w} \cos wt$$

That is, assuming that the fundamental of the square wave G is:

$$E_1 \sin wt$$

and that the integral of this fundamental at the output of an integrator 78 is:

$$-E_{1/w} \cos wt$$

then, varying the amplitude of the square wave in direct proportion to its frequency before it enters the integrator 78, will eliminate the frequency factor $w$ such that the peak amplitude at the output of the integrator 78 will remain constant.

In order to accomplish the foregoing it is, of course, necessary to provide positive and negative voltages on conductors 93 and 95, respectively, which vary in direct proportion to the frequency of the input signal. This is accomplished by applying the output of rectifier 34 (waveform F in FIGURE 2) to a one-shot multivibrator, enclosed by broken lines and identified by the reference numeral 98. The one-shot multivibrator 98 includes a pair of transistors 100 and 102, each having its base connected to a source of B+ potential through resistor 104 and 106 respectively. Similarly, the collectors of the transistors are connected to ground through resistors 108 and 110 respectively. The base of transistor 100 is connected to the collector of transistor 102 through the parallel combination of resistor 112 and capacitor 114; while the base of transistor 102 is connected to the collector of transistor 100 through the parallel combination of resistor 116 and capacitor 118. This, of course, is standard cross-coupling for a one-shot multivibrator.

The emitter of transistor 102 is connected to the B+ voltage source through resistors 120 and 122. The emitter of transistor 100 is connected to the emitter of transistor 102; and the emitters of both transistors are connected through resistor 124 to the base 1 of a normally cut-off uni-junction transistor 126. The base 2 of this same uni-junction transistor is connected to ground through the parallel combination of resistor 128 and capacitor 130, and is also connected to a source of negative biasing potential through resistor 132. The junction between resistors 120 and 122 is connected through capacitor 134 and variable resistor 136 to the collector of transistor 102.

In the operation of the one shot multivibrator 98, transistor 100 is normally conducting while transistor 102 is cut off. However, when a positive pulse from rectifier 34 is applied to the base of transistor 100 through conductor 138, transistor 100 will cut off and, because of the cross-coupling connection shown, transistor 102 will conduct. When tranistor 102 conducts, capacitor 134 discharges, its discharge rate being dependent upon the value of variable resistor 136. Transistor 102 will continue to conduct with the capacitor 134 discharging until the uni-junction transistor 126 breaks down, at which point a negative potential is applied through resistor 124 to the emitter of transistor 100, whereupon transistor 100 conducts and transistor 102 is cut off.

The period of conduction of transistor 102 determines the pulse width of the output pulses from the multivibrator; and this pulse width will remain the same for a particular setting of the resistor 136 regardless of the frequency of the input pulses. This is perhaps best shown in FIGURE 3 wherein pulses 140 and 142 from circuit 98 at one input frequency (waveform A') have a width $W_1$. The spacing between successive pulses is identified as $W_2$. At a higher frequency of the input, illustrated by waveform B' in FIGURE 3, the width of the output pulses from circuit 98 is still $W_1$; however the spacing between successive pulses 144 and 146 is now $W_3$. Thus, the width of the pulses at the output of one-shot multivibrator 98 remains constant regardless of the input frequency, but since the number of such pulses is a direct function of frequency, it can be appreciated that integrating the pulses at the output of the one-shot multivibrator 98 will produce a direct current voltage which varies in proportion to the input frequency.

In order to derive the positive voltage for electron switch 76 which varies in direct proportion to frequency, the signal appearing on the collector of transistor 102 is delivered through conductor 125 to a filter-integrator circuit 148. In this circuit 148, the areas beneath pulses 140 and 142 are integrated to produce the desired direct current voltage. The pulse appearing on the collector of transistor 100 are delivered through conductor 127 to a second filter-integrator circuit 150; and it will be appreciated that the pulses on the collector of transistor 100 are reversed in polarity with respect to those on the collector of transistor 102. That is, the waveform appearing at the collector of transistor 100 will be inverted with respect to that appearing at the collector of transistor 102.

In this case it can be seen that integrator 150 actually integrates the area of the spaces between pulses in waveform A' rather than the areas of the pulses themselves (see waveform C' in FIGURE 3). If the integrated voltage at the output of integrator 148 is defined as a constant times frequency (i.e., $kf$), then the output of integrator 150 can be defined as one minus a constant times frequency (i.e., $1-kf$) since we are now integrating the other half of the waveform. By eliminating the factor "1" in the foregoing expression, it will be appreciated that the voltage proportional to $(-kf)$ will result. This is accomplished, for example, in voltage subtraction circuitry 152 which, for example, may simply comprise a battery connected in series with the output of integrator 150 to eliminate the component "1" mentioned above.

It can be seen, therefore, that the effect of the one-shot multivibrator 98, integrators 148 and 150, and element 152 is to apply voltages to conductors 93 and 95 of opposite polarity which vary directly with respect to the frequency of the pulses at the output of circuit 16. After integration in integrator 78, the triangular waveform H of FIGURE 2 will be of constant amplitude regardless of the input frequency because of the operation of electron switch 76 heretofore described.

The integrated signal comprising waveform H is then shaped into a sine wave (waveform I in FIGURE 2) by means of circuit 154 which includes a field effect transistor 156 having a source electrode 158, a gate electrode 160 and a drain electrode 162. The drain electrode 162 is connected to the output of integrator 78 through resistor 164; while the source electrode 158 is connected to a source of negative potential, B—, through variable resistor 166. The output of integrator 78 is connected to the source of negative potential through a voltage divider comprising resistors 168 and 170, each resistor being in shunt with a diode 172, 174 respectively.

The characteristics of the circuit 154 are shown in FIGURE 4 with the input being plotted against the output. Note that the input-output characteristic is essentially S-shaped. From FIGURE 4 it will be appreciated that when the input is a triangular waveform, the output will assume a sinusoidal shape due to the fact that the slope of the input-output curve flattens at its opposite ends where the peaks of the triangular wave occur. The output waveform I is taken from the source electrode 158 as shown.

Up to this point, we have described the circuitry for obtaining one of two sine wave signals. The circuitry for producing the other sine wave signal which is displaced 90° with respect to waveform I includes the triangular wave rectifier 30. This circuit, in essence, is a full-wave rectifier and includes a transistor 176 having its emitter connected to a source of negative potential B— through resistor 178 and its collector connected to a source of positive potential B+ through resistor 180.

Resistors 182 and 184 are connected in series between the sources of positive and negative potentials; and the junction of these two resistors is connected to the base of transistor 176. The input signal on conductor 28, comprising waveform C in FIGURE 2 is applied through coupling capacitor 186 to the base of transistor 176. With this arrangement, triangular waveforms will appear at the emitter and collector of transistor 176 which are 180° out of phase with respect to each other. These signals are coupled through capacitors 188 and 190 to resistors 192 and 194, respectively.

Rectification is by means of diodes 196 and 198, the waveform at junction 200 comprising the original waveform C in which the negative half cycles are inverted. Due to the alternating current coupling through capacitors 188 and 190, however, the zero ground level of the waveform is intermediate the upper and lower peaks of the triangular waveform such that it appears as waveform J in FIGURE 2. This waveform is applied through emitter follower 202 to a second Schmitt trigger 204 which is adjusted to fire at the zero crossing of the triangular waveform J. Accordingly, the output of the Schmitt trigger circuit 204 will appear as waveform K in FIGURE 2. This waveform is applied to a second electron switch 206, corresponding to electron switch 76 previously described, which eliminates the frequency sensitivity of a following integrator 208. The output of the integrator 208, therefore, will appear as waveform L in FIGURE 2. It will be noted that triangular waveform L lags waveform H by 90°. Consequently, after passing through sine wave shaper 210, corresponding to sine wave shaper 154 already described, the signal will appear as sine wave M in FIGURE 2, which sine wave lags the sine wave I at the output of circuit 154 by 90°.

It can thus be seen that the present invention provides circuitry for converting a pulsed input signal into two sine wave signals of constant amplitude which are displaced with respect to each other by 90°. Although the invention has been described in connection with a certain specific embodiment, it will be readily apparent to those skilled in the art that various changes in form and arrangement of parts may be made to suit requirements without departing from the spirit and scope of the invention.

We claim:

1. In apparatus for converting a pulsed input signal into a sine wave output signal, the combination of circuitry responsive to said pulsed input signal for producing a symmetrical square-wave signal which passes through one 360° cycle for each pulsed input signal, means coupled to the output of said circuitry for varying the amplitude of the symmetrical square-wave signal in inverse proportion to the repetition rate of pulses in said input signal, an integrator coupled to the output of said amplitude varying means for producing a triangular waveform of constant peak amplitude regardless of the repetition rate of pulses in said input signal, and a sine wave shaper coupled to the output of said integrator.

2. In apparatus for converting spiked input pulses into a sine wave output signal of constant peak amplitude and having a frequency corresponding to the pulse repetition rate of said input pulses, the combination of circuitry responsive to said spiked input pulses for producing a second series of spiked pulses in which the pulses are intermediate successive ones of the original input pulses and of the same repetition rate as the original input pulses, a dual trigger bistable multivibrator responsive to the original spiked input pulses as well as said second series of spiked pulses for producing a symmetrical square-wave signal which passes through one 360° cycle for each original spiked input pulse, means coupled to the output of said dual trigger bistable multivibrator for varying the amplitude of the symmetrical square-wave signal in inverse proportion to the reptition rate of said original spiked input pulses, an integrator coupled to the output of said amplitude varying means for producing a triangular waveform of constant peak amplitude regardless of the repetition rate of said original spiked input pulses, and a sine wave shaper coupled to the output of said integrator.

3. In apparatus for converting spiked input pulses into a sine wave output signal of constant peak amplitude and having a frequency corresponding to the repetition rate of said spiked input pulses, the combination of a flip-flop circuit responsive to said input pulses for producing a symmetrical square-wave signal which passes through one 360° cycle for every two input pulses, a first integrator coupled to the output of said flip-flop circuit for producing a triangular waveform, means for full-wave rectifying said triangular waveform, a Schmitt trigger circuit coupled to the output of said full-wave rectifier for producing a symmetrical square-wave signal which passes through one 360° cycle for every input pulse applied to said flip-flop circuit, means coupled to the output of said Schmitt trigger circuit for varying the amplitude of the symmetrical square-wave signal produced by the Schmitt trigger circuit in inverse proportion to the repetition rate of said input pulses, a second integrator coupled to the output of said amplitude varying means for producing a triangular waveform of constant peak amplitude regardless of the repetition rate of said input pulses, and a sine wave shaper coupled to the output of said second integrator.

4. In apparatus for converting spiked pulses into a pair of sine wave output signals disposed 90° in phase with respect to each other and of constant peak amplitude, the combination of circuitry responsive to said input pulses for producing a first symmetrical square-wave signal which passes through one 360° cycle for each input pulse, means coupled to the output of said circuitry for varying the amplitdue of the first symmetrical square-wave signal in inverse proportion to the repetition rate of said input pulses, a first integrator coupled to the output of said amplitude varying means for producing a first triangular waveform of constant peak amplitude regardless of the repetition rate of said input pulses, a first sine wave shaper coupled to the output of said first integrator, a flip-flop circuit responsive to said input pulses for producing a second square-wave signal which passes through one 360° cycle for every two input pulses applied thereto, a second integrator coupled to the output of said flip-flop circuit for producing a second triangular waveform, means for full-wave rectifying said second triangular waveform, a Schmitt trigger circuit coupled to the output of said full-wave rectifier for producing a third square-wave signal which passes through one 360° cycle for each pulsed input signal but which is displaced 90° with respect to said first symmetrical square-wave signal, means coupled to the output of said Schmitt trigger circuit for varying the amplitude of the third symmetrical square-wave signal in inverse proportion to the repetition rate of said input pulses, a third integrator coupled to the output of said last-named means for producing a third triangular waveform of constant peak amplitude regardless of the repetition rate of said input pulses, and a sine wave shaper coupled to the output of said third integrator for producing a sine wave signal of constant peak amplitude which is shifted in phase by 90° with respect to the first-mentioned sine wave signal.

5. In apparatus for converting a pulsed input signal of variable repetition rate into a sine wave output signal of constant peak amplitude and having a frequency corresponding to the repetition rate of said pulsed input signal, the combination of circuitry responsive to said pulsed input signal for producing a symmetrical square-wave signal which passes through one 360° cycle for each pulse in the input signal, means responsive to pulses in said input signal for producing at least one steady-state signal the magnitude of which varies in inverse proportion to the repetition rate of said pulses in the input signal, electron switch means responsive to said symmetrical square-wave signal and said steady-state signal for varying the amplitude of the symmetrical square-wave signal in inverse proportion to the repetition rate of pulses in said input signal, an integrator coupled to the output of said electron switch means for producing triangular waveform of constant peak amplitude regardless of the repetition rate of pulses in said input signal, and a sine wave shaper coupled to the output of said integrator.

6. In apparatus for converting a pulsed input signal of variable repetition rate into a sine wave output signal of constant peak amplitude and having a frequency corresponding to the repetition rate of pulses in the input signal, the combination of circuitry responsive to said pulsed input signal for producing a symmetrical square-wave signal which passes through one 360° cycle for each pulse in the input signal, means responsive to said pulses in the input signal for producing positive and negative steady-state voltages which vary in magnitude in inverse proportion to the repetition rate of pulses in said input signal, electron switch means responsive to said symmetrical square-wave signal and to both of said positive and negative steady-state voltages for varying the amplitude of the symmetrical square-wave signal in inverse proportion to the repetition rate of pulses in the input signal, an integrator coupled to the output of said amplitude varying means for producing a triangular waveform of constant peak amplitude regardless of the repetition rate of said pulses in the input signal, and a sine wave shaper coupled to the output of said integrator.

7. The apparatus of claim 6 wherein said electron switch means includes an NPN and a PNP transistor each having an emitter, a collector and a base, means connecting the emitters of said transistors to ground, means for applying said positive and negative steady-state voltages to the collectors of the NPN and PNP transistors respectively, and means for applying said symmetrical square-wave signal to the bases of both of said transistors whereby the NPN transistor will conduct on a positive half cycle of the square-wave signal while the PNP transistor will conduct on the negative half cycle.

8. The apparatus of claim 6 wherein the circuitry for producing positive and negative steady-state voltages includes a one-short multivibrator responsive to said input pulses and having a pair of electron valves interconnected such that when one electron valve conducts the other is cut off and vice versa, first filter means coupled to one of said electron valves for producing one of said steady-state voltages, and second filter means coupled to the other of said electron valves for producing the other of said steady-state voltages.

9. In apparatus for converting a pulsed input signal into a sine wave output signal, the combination of means for shifting pulses in the input signal in phase in an amount equal to one-half the spacing between said pulses, a dual trigger bistable multivibrator having a pair of input terminals and arranged such that an pulse applied to one input terminal will cause the output from the multivibrator to rise in voltage while an pulse applied to the other input terminal will cause the output from the multivibrator to fall in voltage, means for applying pulses at the output of said phase shifting means to said one input terminal, means for applying input pulses which have not been shifted in phase to the other of said input terminals, the output of said dual trigger bistable multivibrator being a symmetrical square-wave signal which passes through one 360° cycle for each pulsed input signal, means coupled to the output of said dual trigger bistable multivibrator for varyilng the amplitude of the symmetrical square-wave signal in inverse proportion to the repetition rate of said input pulses, an integrator coupled to the output of said amplitude varying means for producing a triangular waveform of constant peak amplitude regardless of the repetition rate of said input pulses, and a sine wave shaper coupled to the output of said integrator.

No References Cited.

ARTHUR GAUSS, *Primary Examiner.*

J. ZAZWORSKY, *Assistant Examiner.*